United States Patent [19]

Petruzzi et al.

[11] 4,213,271
[45] Jul. 22, 1980

[54] PLANTER

[75] Inventors: Thomas G. Petruzzi, Orlando, Fla.; Harold P. Ashton, Providence, R.I.; Rino Conti, Stoughton, Mass.

[73] Assignee: Dart Industries Inc., Los Angeles, Calif.

[21] Appl. No.: 35,741

[22] Filed: May 3, 1979

[51] Int. Cl.³ .............................................. A01G 9/02
[52] U.S. Cl. .......................................... 47/39; 47/71; 47/79; 47/68
[58] Field of Search ................... D11/143, 156; 47/71, 47/79–81, 66, 39, 59, 63–64, 68

[56] References Cited

U.S. PATENT DOCUMENTS

| 1,474,753 | 11/1923 | Zrebiec | 47/39 |
|---|---|---|---|
| 1,561,824 | 11/1925 | Boehm | 47/71 |
| 1,989,403 | 1/1935 | Dauernheim | 47/39 |
| 3,099,355 | 7/1963 | Kane | 47/39 X |
| 3,760,534 | 9/1973 | Choux et al. | 47/39 |
| 3,852,912 | 12/1974 | Diller | 47/39 X |
| 4,040,207 | 8/1977 | Lancaster | 47/80 |
| 4,070,794 | 1/1978 | Gibbs | 47/79 |
| 4,083,146 | 4/1978 | Brankovic | 47/71 |

FOREIGN PATENT DOCUMENTS 1414605 9/1965 France ............................................... 47/80

Primary Examiner—Robert E. Bagwill
Attorney, Agent, or Firm—Leigh B. Taylor

[57] ABSTRACT

A planter having a supporting tray and potting vessel arrangement wherein the vessel is supported with its bottom portion within a tray compartment and in juxta-position with the compartment walls. The vessel tray combination further provides for the access of air to the compartment and for its direction up and around vegetation foliage within the vessel.

9 Claims, 11 Drawing Figures

PLANTER

The invention relates to a planter system or arrangement and more particularly to a structural concept wherein a potting vessel is supported in spaced relationship to a tray and excess water in the tray below the vessel is allowed to evaporate in the air circulating around same thereby creating a moist atmosphere in close proximity to the vegetation foliage in the vessel.

Typical prior art planters employ a drainage basin that is remote from the upper edge of the potting vessel and there is no means to direct circulating air therearound toward the vegetation foliage in the planter. This invention provides a plurality of passageways at the upper edge which communicate with a closed compartment formed between the tray and vessel so that circulating air is directed into the area of vegetation foliage. This ensures that the potted vegetation has the advantage of a continuing moist atmosphere about its foliage even after the water has evaporated from the potting soil surface.

These and other objects and advantages will become apparent from the ensuing specification and claims describing specific embodiments of the invention and drawings wherein:

Figure 1:
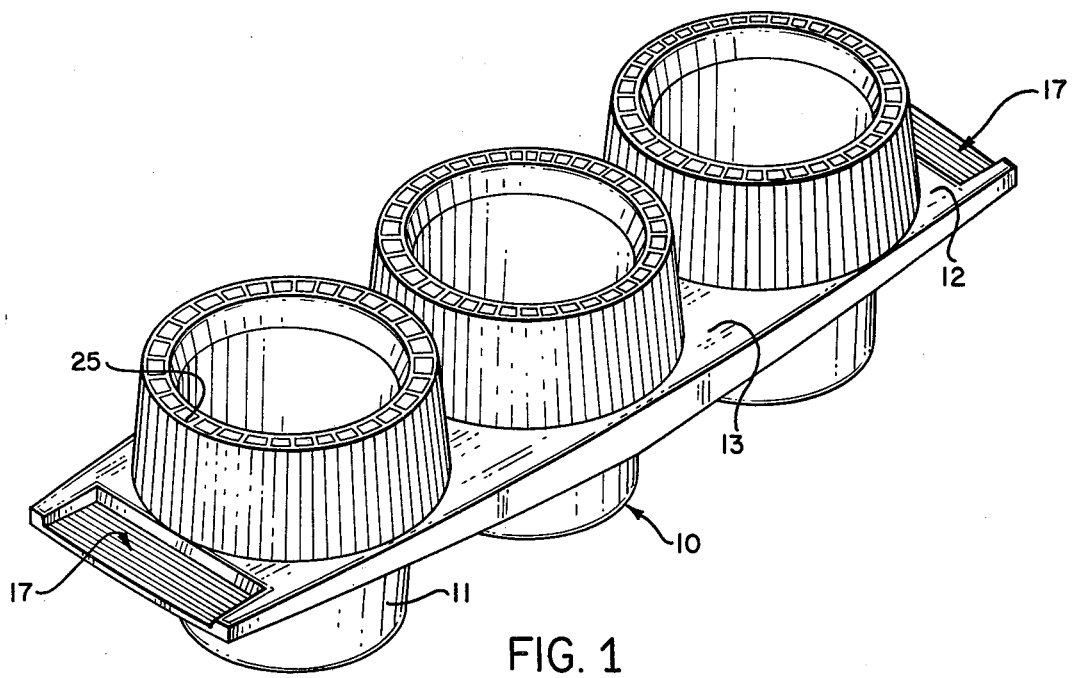
FIG. 1 is a perspective view of a planter according to the invention and shows a preferred embodiment in a trio arrangement.

Referring now to the drawings, the planter 10 includes a plurality of individual compartments 11 supported by tray 12. In the preferred embodiment illustrated, three individual compartments 11 are aligned in a single row along supporting tray 12 which is of a generally rectangular shape and include a peripherally extending flange portion 13. The individual compartments 11 are further formed by an upstanding wall arrangement 14 having an open-topped rim 15 extending above the plane of supporting web 12 and an integral base 16.

Figure 3:
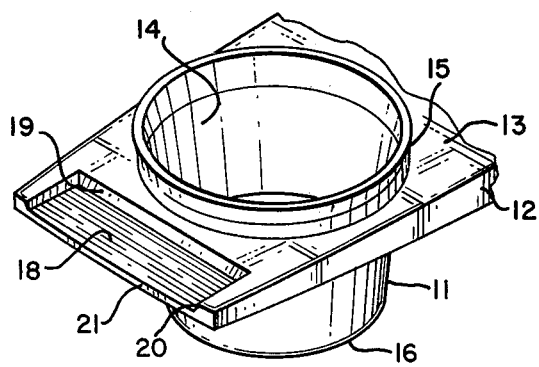
FIG. 3 is a partial top perspective view of the tray support shown in FIGS. 1 and 2, taken along line 3—3 of FIG. 2.
Figure 4:
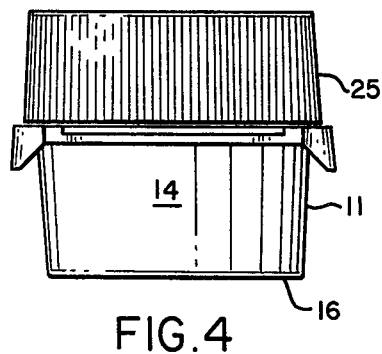
FIG. 4 is an end view of the planter shown in the preceding figures and looking along line 4—4 of FIG. 2.
Figure 5:
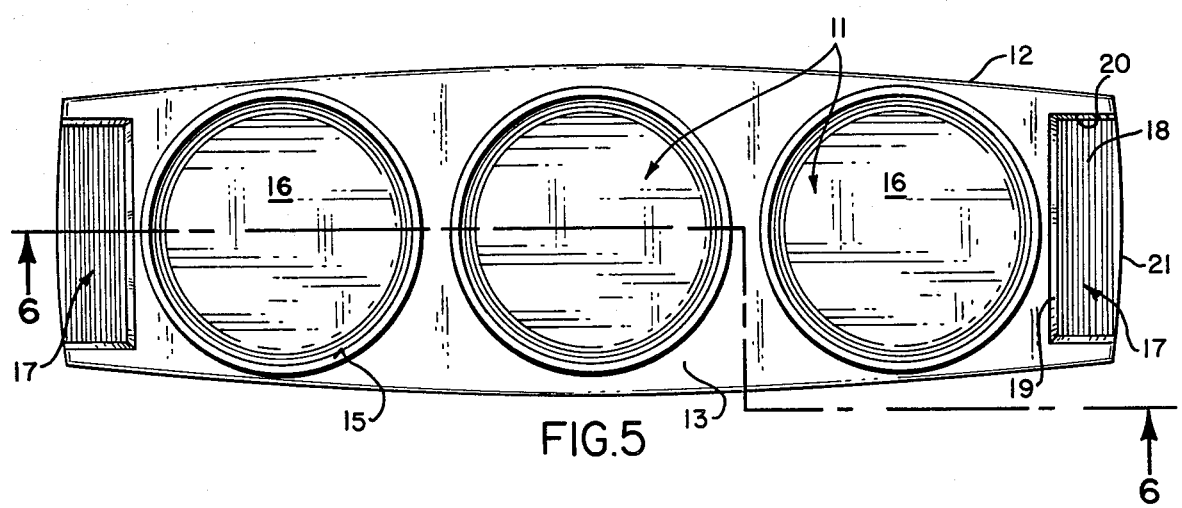
FIG. 5 is a top plan view of the tray support for the planter according to the invention.
Figure 6:
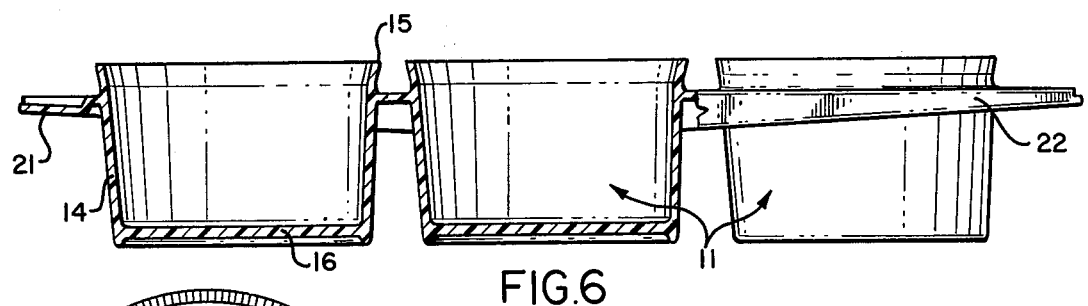
FIG. 6 is a partial cross-sectional view of the tray support taken on line 6—6 of FIG. 5.

The tray support 12 is further provided with finger grippable handle projections 17. As best seen in FIGS. 1, 3 & 6, handle means projections 17 are formed as a stepped down portion 18 of support 12. The stepped down portion is formed with a slanted end wall 19, slanted side walls 20, and an outwardly extending upwardly slanted base portion 21. This particular arrangement has been found to provide a handle which can easily be gripped.

For the purpose of rigidifying tray 12, a depending brim 22 that is directed substantially perpendicular to the peripheral flange portion 13 and preferably formed as a trussed support member is provided on the longest edges thereof. The brim 22 tapers downwardly to a point 23 and upwardly to a point of minimum width at the ends 24 thereof. This particular arrangement of brim 22 has been found to provide maximum rigidity to the rectangularly shaped supporting tray when it is used in the manner shown to support individual compartments that are aligned in a single row.

In the arrangement shown, the integral bases 16 of each of the individual compartments terminates substantially in a plane whereby the planter 10 can be placed upon a flat surface in stable non-rockable and resting position.

Figure 2:
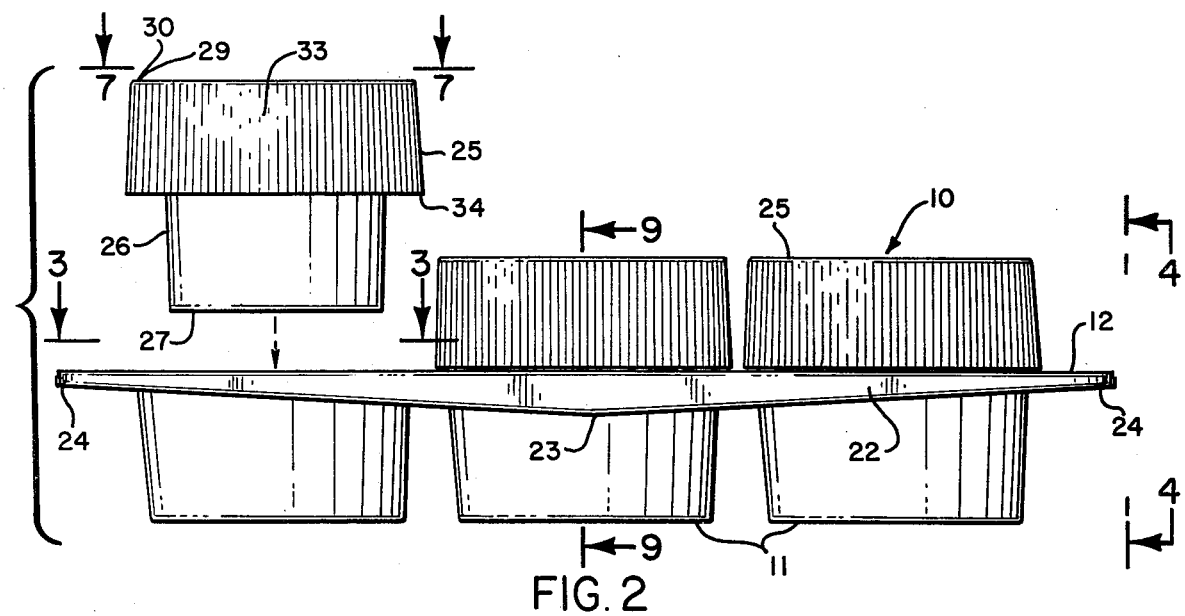
FIG. 2 is a side elevational view of the planter of FIG. 1, with one potting vessel being shown exploded from the tray support therefor.
Figure 7:
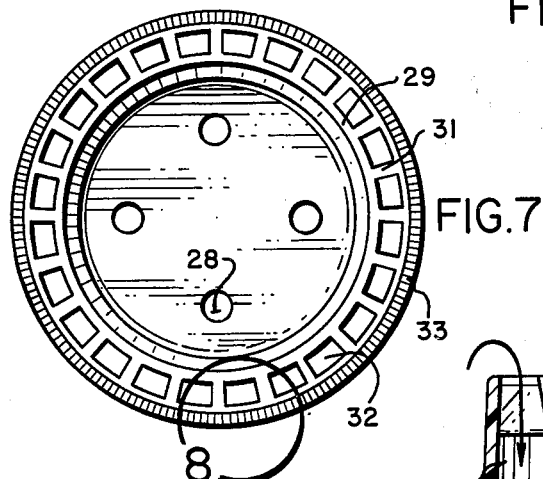
FIG. 7 is a top plan view of the vessel according to the invention.

The potting vessel 25 (FIGS. 2, 7 and 8) is comprised of a side wall structure 26 and integral bottom wall 27 having openings 28 therethrough. Furthermore, in the preferred embodiment the side wall top edge 29 has a generally horizontally extending lip 30 that protrudes outwardly therefrom and is formed by the vertically arranged fins 31. Such fins, as can readily be appreciated from FIGS. 7 and 8, identify a plurality of passageways 32 through lip 30, the purpose of which are more fully described thereinbelow, and further provide for the rigid attachment of depending skirt 33 to side wall 26.

Figures 8, 9:
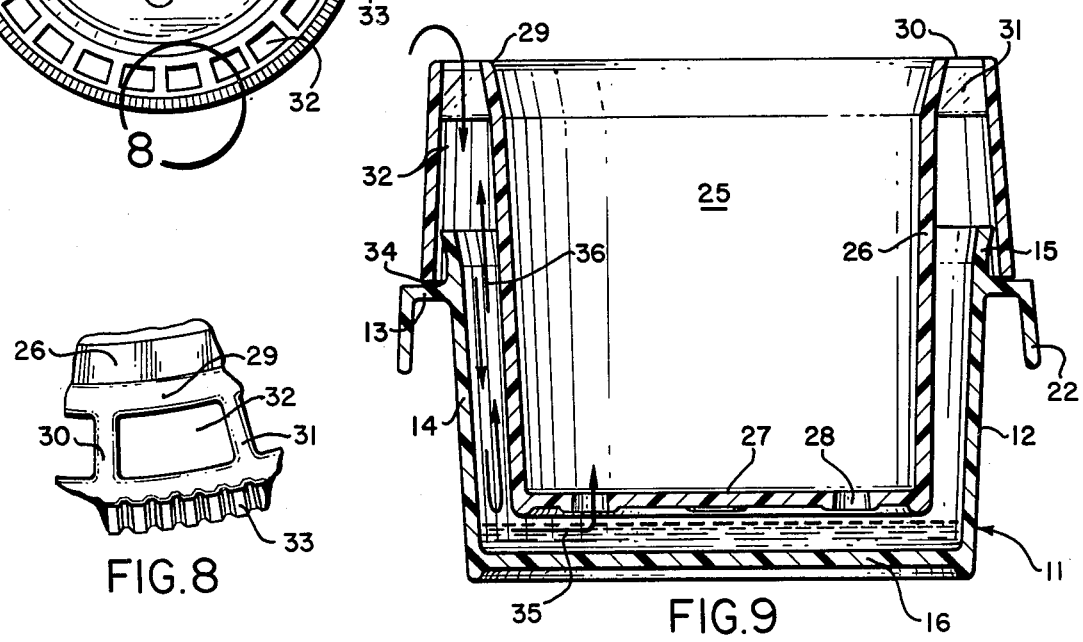
FIG. 8 is an enlarged cross-sectional view of an edge portion of the vessel taken along circular break-out 3 of FIG. 7.
FIG. 9 is an enlarged cross-sectional view of the planter taken along line 9—9 of FIG. 2.

As can best be seen in FIG. 9, the potting vessels 25 are adapted for placement in planter tray compartments 11. Such placement finds the vessel located with its side wall structure 26 and bottom wall 27 in juxtaposition with the upstanding wall arrangement 14 and the base 16 respectively of tray support compartment 11. This position is determined by the interengagement of the terminal edge 34 of skirt 33 with the upper side of the peripheral flange portion 13 of tray support 12 and the close relationship between rim 15 and the inside surface of skirt 33.

Furthermore, such positioning is significant to the intended operation of the planter. Note that the potted vegetation in vessels 25 is intended to be watered through the soil supporting same and that excess water 35 is to flow through openings 28 and into compartment 11 below vessel bottom wall 27. Air, indicated by arrows 36 can readily move through passageways 32, down and back out between the juxtaposed walls 14, 26. This air likewise, will contact the excess water which will evaporate and be carried thereby. Accordingly, the circulatory activity of the air surrounding the planter will provide a moist atmosphere that will be directed by fins 31 about the vegetation foliage. Similarly, this moisture laden air is exposed to the soil supporting the vegetation root system through openings 28.

Figure 10:
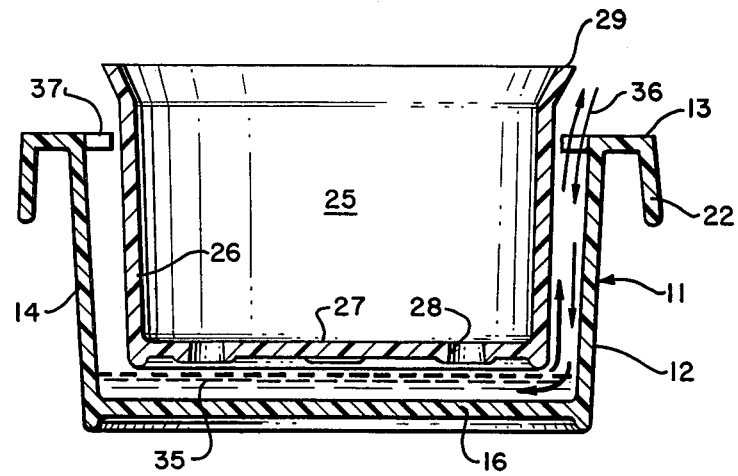
FIG. 10 is another embodiment of a planter according to the invention.

In several alternative structural arrangements the same objectives can be achieved with differing element configurations. For example, in FIG. 10 it can be seen that the depending skirt 33, lip 30 and fins 31 have been replaced by an extension 37 to peripheral flange portion 13. Such extension would, of course, have appropriate vents similar to passageways 32 to accommodate the circulation of air as indicated in FIG. 9. Likewise, these extensions would engage the vessel side wall structure 26 and thereby support vessel 25 in the mentioned juxtaposed position with respect to compartment 11.

Figure 11:
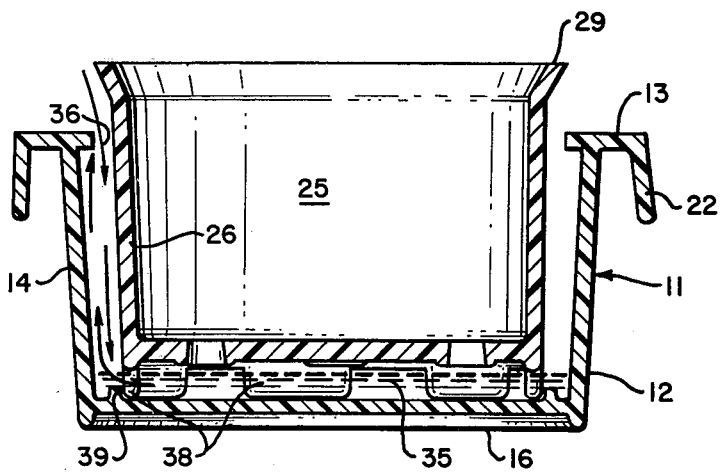
FIG. 11 is still a further embodiment thereof.

FIG. 11 depicts yet another arrangement wherein lip 30, fins 31 and skirt 33 may be omitted. Instead, the side wall structure 26 of vessel 25 may be extended in a foot-like configuration 38 and the base 16 of compartment 11 is provided with ridge 39 to abut configuration 38 and thereby properly position vessel 25.

From the foregoing it should be apparent that an unusually effective planting method is conceived hereby and the appended claims define the scope thereof except that reasonable variations and modifications may be made so long as made within the confines of the disclosure.

We claim:

1. A planter including a combined tray support and vessel wherein said tray support incorporates at least one compartment formed by a base and upstanding wall arrangement and a peripheral flange portion positioned about said compartment intermediate the longitudinal extent thereof, said vessel being formed by a side wall structure, an integral bottom wall having at least one opening therethrough and a skirt affixed to said side wall structure and positioned such that a terminal edge thereof lies in a plane intermediate said bottom wall and the top edge of said side wall structure, said skirt being in close juxtaposition about said compartment above said terminal edge in abutment with said flange portion and said side wall structure and bottom wall being within said compartment and in juxtaposition with said upstanding wall arrangement and base respectively.

2. A planter according to claim 1 wherein said tray support includes a plurality of compartments and a corresponding number of vessels.

3. A planter according to claim 1 wherein said skirt depends from and is affixed to the top edge of said side wall structure.

4. A planter according to claim 3 wherein said skirt is affixed to said side wall structure by a substantially horizontal lip which includes at least one passageway therethrough.

5. A planter according to claim 1 wherein said skirt includes at least one passageway therethrough.

6. A planter according to claim 4 wherein said lip is comprised of a plurality of substantially vertically arranged fins which are uniformly spaced about said side wall adjacent the top edge thereof.

7. A planter according to claim 1 wherein said tray support includes handle projections positioned in said flange portion.

8. A planter according to claim 2 wherein said flange portion interconnects said compartments.

9. A planter according to claim 8 wherein said tray support includes handle projections positioned in said flange portion.

* * * * *